United States Patent [19]
Kordik

[11] Patent Number: 4,584,495
[45] Date of Patent: Apr. 22, 1986

[54] PERFORMANCE STEP MOTOR

[75] Inventor: Kenneth S. Kordik, Aptos, Calif.

[73] Assignee: Applied Motion Products, Inc., Scotts Valley, Calif.

[21] Appl. No.: 682,659

[22] Filed: Dec. 17, 1984

[51] Int. Cl.⁴ .................................. H02K 37/00
[52] U.S. Cl. ........................... 310/49 R; 310/156
[58] Field of Search .............. 310/49 R, 162, 163, 310/156, 263, 178, 42, 261, 181, 40 MM, 254; 335/303

[56] References Cited

U.S. PATENT DOCUMENTS

| | | | |
|---|---|---|---|
| 2,810,085 | 10/1957 | Akeley | 310/162 |
| 2,848,632 | 8/1958 | Keene | 310/162 |
| 2,897,384 | 7/1959 | Muller | 310/261 |
| 3,197,659 | 7/1965 | Marshall | 310/49 R |
| 3,286,109 | 11/1966 | Madsen | 310/49 R |
| 3,453,465 | 7/1969 | De Boer | 310/49 R |
| 3,465,225 | 9/1969 | O'Regan | 310/49 R |
| 3,466,476 | 9/1969 | Snowdon | 310/49 R |
| 3,496,393 | 2/1970 | Reifman | 310/49 R |
| 3,621,312 | 11/1971 | Palermo | 310/49 R |
| 3,777,196 | 12/1973 | Field | 310/49 R |
| 3,790,831 | 2/1974 | Morreale | 310/49 R |
| 3,890,514 | 6/1975 | Mutz | 310/49 R |
| 4,025,810 | 5/1977 | Field | 310/162 |
| 4,028,568 | 6/1977 | Tatsumi | 310/42 |
| 4,070,592 | 1/1978 | Snowdon | 310/49 R |
| 4,081,703 | 3/1978 | Madsen | 310/49 R |
| 4,234,808 | 11/1980 | Geppert et al. | 310/156 |
| 4,307,314 | 12/1981 | Yamada | 310/263 |
| 4,513,216 | 4/1985 | Muller | 310/156 |

FOREIGN PATENT DOCUMENTS 0180240 7/1964 U.S.S.R. .................................. 310/49

OTHER PUBLICATIONS

Warner Electric's Guide to Selecting and Controlling Step Motors; 1979; Warner Elect. Brake & Clutch Co.; Beloit, Wisc.

Primary Examiner—R. Skudy
Attorney, Agent, or Firm—Michael J. Hughes

[57] ABSTRACT

The invention is an improved performance step motor (10) including a shorted turn mechanism in the nature of a conducting ring (32) or one or more closed loop conductive strands (50) circumferentially disposed about a ring-shaped exposed magnet zone (48) in the rotor assembly (18) of a conventional hybrid synchronous inductor type step motor. The shorted turn device operates to interact with the magnetic fields created in a rotor magnet (40), a first rotor yoke (42) and a second rotor yoke (44) with the induced magnetic field generated in a stator assembly (24) including a plurality of stator pole pieces (62). The insertion of the shorted turn device results in a balancing of the magnetic fields in such a manner that the oscillation time required to bring the motor to stop at a desired position with standard back phase damping techniques or with no additional damping techniques is substantially reduced. The predominant usage of the present invention is in step motors utilized in data processing applications such as daisy wheel printers and disk drive head positioning devices.

16 Claims, 5 Drawing Figures

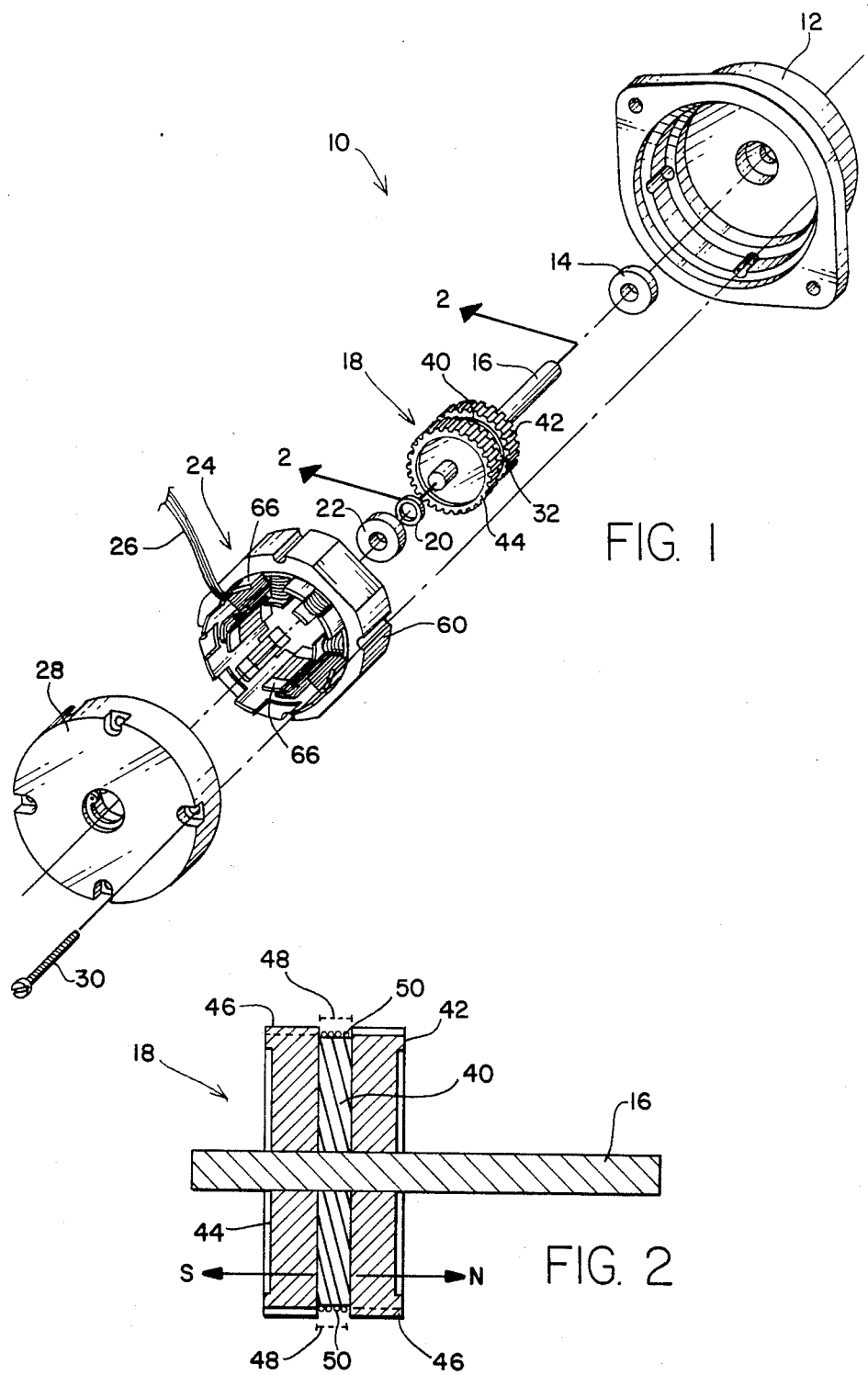

PERFORMANCE STEP MOTOR

TECHNICAL FIELD

The present invention relates generally to electrical motor devices and more particularly to magnetic step motors which are capable of achieving preferential stopping in a great number of rotational positions. The predominant current usage of the improved step motor assembly of the present invention is in connection with step motors used in the data processing industry, such as in printers and disk drives.

BACKGROUND ART

Step motors (sometimes called stepper motors) are electromagnetic motors which are designed such that they have a large number of preferred rest positions, that is; the internal magnetic torques in the motor urge the rotating shaft to one of several specific locations. Step motors are extremely useful in any application which requires incremental motion. They are particularly important in the data processing industry since they are ideally suited for positioning the heads on disk drives, positioning rotating print devices such as daisy wheels or thimbles and for use in many other devices requiring fast and accurate positioning of rotary or sliding elements at a low cost.

An excellent prior art description of the various types of step motors available and their operation is contained in a publication entitled *Warner Electric's Guide to Selecting and Controlling Step Motors,* copyright 1979, by the Warner Electric Brake and Clutch Company of Beloit, Wis. (hereinafter "Warner"). This publication provides a source for terminology and explanation of associated but noncritical elements of the motors and circuitry utilized with the present invention.

As is described in part III. L of Warner, one of the primary necessary associated considerations in dealing with step motors is in providing a method of damping the oscillation which results when a motor element having rotational momentum is caused to stop at a particular point. It is an inevitable consequence of all step motors that the rotation momentum results in an overshoot and a certain degree of oscillation will occur whenever it is necessary to stop the rotation of the shaft at a desired rest point. The magnitude of this overshoot oscillation is ordinarily in the range of 15 to 100 milliseconds (ms) or more. Consequently, it has been a continuing goal of prior art devices to minimize the oscillation about the desired rest point and thus to minimize the time required to bring the motor and the associated device to a full stop.

Newer applications have required higher speed motors and have thus also required better, more powerful and quicker oscillation damping mechanisms. It is also desirable that the damping mechanisms not have deleterious effects on the other characteristics of the motor such as the high speed resistance torque, the pull-out torque, the pull-in torque, the holding torque, the positioning accuracy and other relevant characteristics. Additionally, due to a high degree of competition, the desired methods cannot add drastically to the cost involved.

As outlined in part III. L of Warner, damping mechanisms and schemes come in a great variety.

Some prior art examples of stepper motors and damping apparatus and schemes that have been memorialized in United States patents are U.S. Pat. No. 3,466,476 issued to Snowden, U.S. Pat. No. 3,621,312 issued to Palmero and U.S. Pat. No. 4,070,592 issued to Snowden. These references show hybrid type step motors and refer to the importance of achieving rapid and effective damping.

One common method of achieving damping in step motors is in the use of electrical circuitry to produce feedback signals. A prime example of this is found in U.S. Pat. No. 3,465,225 issued to O'Regan.

Another common method for achieving oscillation damping is to use a fluidic camping mechanism on the rotating shaft elements. Some examples of the use of this type of damping are found in U.S. Pat. No. 3,286,109, issued to Madsen and U.S. Pat. No. 3,890,514 issued to Mutz. One disadvantage of the use of fluidic damping on the shaft mechanisms is that the high speed torque resistance of the motor is increased by the effective momentum friction of the fluidic medium. This results in a reduced high-speed torque for the motor since the drag torque of the damping scheme increases with the velocity of rotation.

Another common category of damping mechanisms occurs with the use of mechanical resistance dampers. Some examples of these type of dampers are found in U.S. Pat. No. 3,197,659, issued to Marshall, U.S. Pat. No. 3,453,465, issued to De Boer, U.S. Pat. No. 3,496,393, issued to Reifman and U.S. Pat. No. 3,790,831, issued to Morreale. The use of a mechanical damper can be very effective but it does require a greater amount of torque to be applied to the motor shaft in order to overcome the load inertia of the damping mechanism. This requires a more powerful motor which increases the cost.

As with all areas of technology, there remains significant room for improvement relating to lowering the cost, increasing the efficiency and maximizing the effectiveness of a given mechanism or type of process. This remains true regarding methods of damping step motors.

DISCLOSURE OF INVENTION

Accordingly, it is an object of the present invention to provide a method of enhancing and improving electronic back phase damping of a stepper motor without having negative effects on any of the other characteristics of the motor, especially the holding torque and the positioning accuracy.

It is another object of the present invention to provide a motor which may be brought to a full stop at a desired rest position using conventional back phase damping in a more rapid fashion.

It is another object of the invention to provide improved damping capability with minimal increase to the complexity of the motor.

It is a further object of the invention to provide a motor wherein the mid-range and high speed resonances are minimized.

This invention relates to step motors utilized in various electronic devices to position elements precisely and rapidly. It is particularly adapted for use with step motors wherein an electronic back phase damping method is utilized to bring the motor to a stop at a desired rest point as quickly as possible. These applications are particularly important in modern high speed step motor applications.

Briefly, a preferred embodiment of the present invention is an electromagnetic step motor having improved damping capabilities. The preferred embodiment is particularly adapted for use with hybrid synchronous inductor step motors wherein the rotor portion includes a permanent magnet. The improved motor of the preferred embodiment includes a stator portion having a multiplicity of congruent radially separated stator poles, the separation of which is determined by standard step motor construction principles, with the extreme ends of the stator poles being divided into several pole teeth. Each of the stator poles will be wound in conventional fashion with one or more strands of conductive material and will be activated such that when an electrical current is generated in the conductive strands a magnetic field will be induced in the stator pole. In the preferred embodiment a bifilar winding pattern utilizing four strands is utilized. The motor further includes a rotor portion which is separated from the stator by a radial air gap and rotates with respect to the stator. The rotor portion includes a shaft and a radially symmetrical magnet which surrounds the shaft and rotates with the shaft. In the present invention the magnet is bordered on its axial edges by a pair of symmetrical yokes, each of which includes a plurality of rotor teeth. The opposing yokes are mounted on the magnet in such a manner that a ring-shaped zone of the magnet is exposed to the radial air gap between the rotor and the stator. A conductive loop, in the nature of an enclosed ring or an electrically conductive strand but nonmagnetic wound one or more times about the ring-shaped exposed zone is provided to complete an electrically conductive loop entirely around the ring-shaped zone. This loop or continuous conductor is known as a "shorted turn". Finally, the motor includes means for attaching external motive and control circuitry such that appropriate electrical signals can be delivered to the conductive strands on the stator for maintaining the operation of the motor.

It is an advantage of the present invention that the improvement may be accomplished on previously existing motors with a minimum of effort.

Another advantage of the present invention is that it accomplishes substantial improvement in oscillation time without having a negative effect on any other of the motor parameters.

A further advantage of the present invention is that the improvement in oscillation time of the motor is not dependent on either time or load factors.

Still another advantage of the present invention is that the shorted turn results in improved mid-range and high-speed resonances.

A still further advantage of the present invention is that it results in reduced electromagnetic frequency back damping at high speed such that the motor is capable of generating increased dynamic torque at high rotational speeds.

Another advantage of the present invention is that it reduces the probability of rotor demagnetization.

A still further advantage of the present invention is that it results in substantially improved performance at a negligible increase in cost of manufacture.

These and other objects and advantages of the present invention will become clear to those skilled in the art in view of the description of the best presently known mode of carrying out the invention and the industrial applicability of the preferred embodiment as described herein and as illustrated in the several figures of the drawing.

BRIEF DESCRIPTION OF THE DRAWING

FIG. 1 is an exploded perspective view of an improved self damping step motor according to the present invention;

FIG. 2 is a cross sectional view taken along line 2—2 of FIG. 1, illustrating the rotor assembly portion of the motor;

BEST MODE OF CARRYING OUT INVENTION

Figure 3:
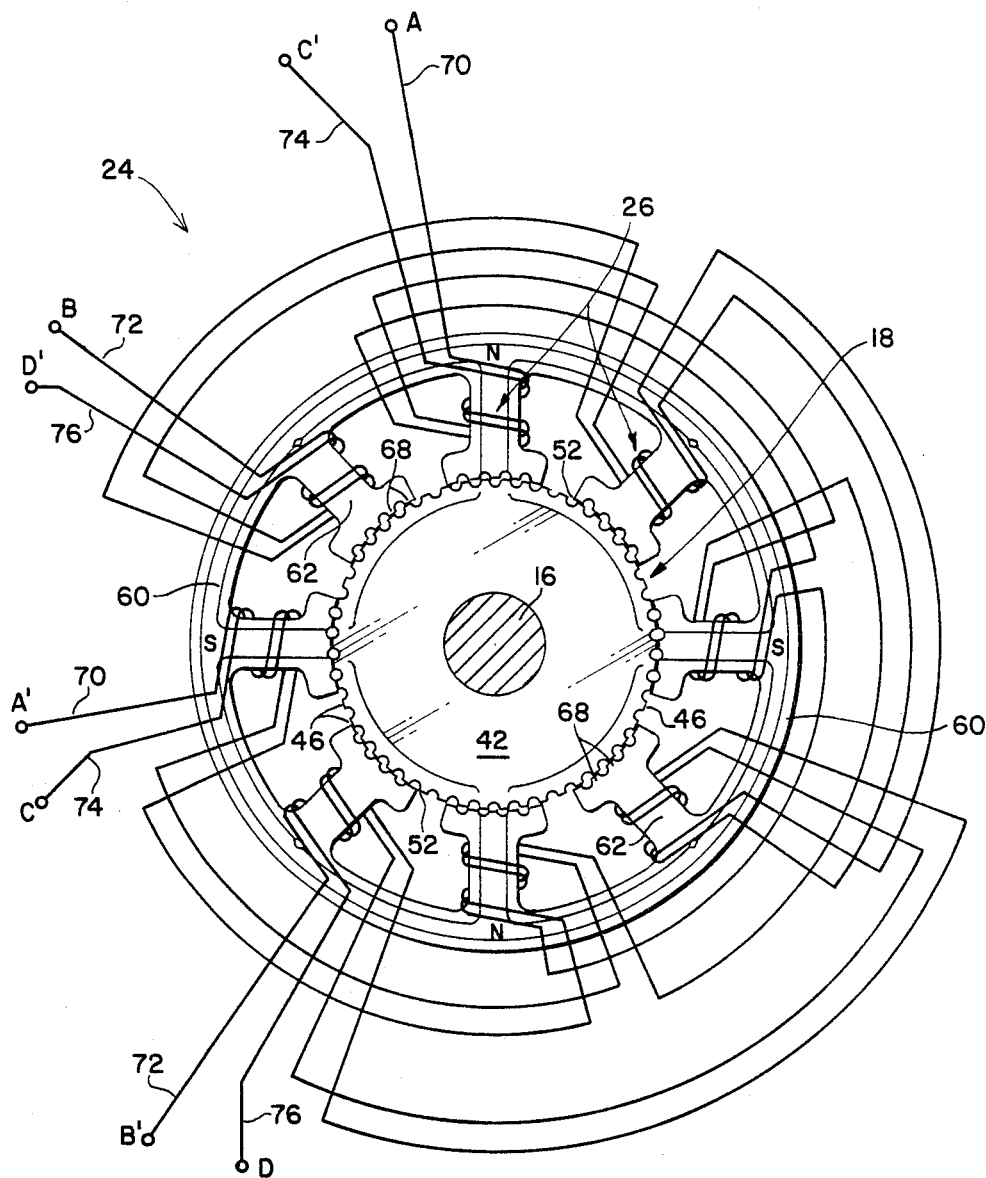
FIG. 3 is a partially schematic top view of the stator and rotor portions of the motor.

The present invention is an improved self damping step motor adapted for use with a conventional back phase damping apparatus such as that widely used in the electronics and data processing industry. The step motor of the present invention is particularly adapted for being utilized in applications wherein the rapid incremental adjustment of various elements is desirable. Some of the more common utilizations of step motors are in daisy wheel type printers and head positioning mechanisms for disk drives.

Although there is no absolute requirement restricting the application of the present invention to a specific type of step motor, the preferred embodiment is illustrated and described herein as being incorporated with a hybrid synchronous inductor step motor. An improved self damping step motor, of the hybrid synchronous inductor variety, and incorporating the improvement of the present invention, is illustrated in an exploded perspective view in FIG. 1, and is designated therein by the general reference character 10.

For the purposes of description, the end of the improved step motor 10 appearing at the upper portion of FIG. 1 shall be designated as the top of the motor. It is understood that the precise orientation of the motor is irrelevant to its operation and that it will function equally well in essentially any selected orientation.

The elements of the improved self damping step motor 10, described in the order of their appearance from the top of the motor and proceeding downward, include a first housing bell 12 which provides the exterior structural member for the motor, a first bearing 14, a rotating shaft 16, upon which is mounted a rotor assembly 18, a spacer bushing 20, a second bearing 22, a stator assembly 24, to which are connected a plurality of stator windings 26 (conducting strands), a second housing bell 28 and a plurality of securing bolts 30. When the motor is fully assembled the securing bolts 30 will secure the second housing bell 28 to the first housing bell 12 to enclose all of the remaining elements of the motor 10 therewithin, except that at least one end of the shaft 16 will protrude through the apertures in the housing bells 12 and 28.

The motor 10 which is illustrated in FIG. 1 is substantially of conventional construction except that the rotor assembly 18 is provided with a "shorted turn" device which improves the performance. In FIG. 1, the shorted turn element is illustrated as a conducting ring 32 which circumferentially surrounds a portion of the rotor assembly 18.

The rotor assembly 18 is illustrated in greater detail in the cross sectional view of FIG. 2, although reference to FIGS. 1 and 3 will also be helpful in understanding the structure. It is characteristic of the rotor assembly 18 that all of the elements are radially symmetrical about the central axis of the shaft 16. This is important since the entire assembly will rotate with the shaft 16 about its central axis in operation, and it is valuable to maintain proper balance such that irregularities are prevented from altering the quality of the rotation of the shaft 16.

As is shown in FIG. 2, the rotor assembly 18 includes a rotor magnet 40 mounted upon the shaft 16. The rotor magnet 40 is a permanently magnetized element of a disc or ring-like shape which is axially polarized such that the magnetic field orientation from one planar surface is axially north and the magnetic field emanating from the opposing surface is axially south, as shown in FIG. 2. The selection of which surface is polarized in which direction is not critical to the operation of the motor.

A first rotor yoke 42 and a second rotor yoke 44 are axially mounted upon the rotor magnet 40. The first and second rotor yokes 42 and 44 are symmetrical in construction and are conductive materials which act to concentrate the magnetic flux of the rotor magnet 40 in a plurality of rotor pole teeth 46, (best seen in FIGS. 1 and 3). The rotor yokes 42 and 44 are rotated slightly with respect to one another such that the pole teeth 46 are offset on the opposing yokes. This offset is important to proper operation of the step motor 10.

The first rotor yoke 42 and the second rotor yoke 44 do not abut against one another but rather provide that a ring-shaped zone 48 of the rotor magnet 40 remains axially exposed. It is within this ring-shaped circumferential zone 48 that the shorted turn element of the invention is installed. In FIG. 2 the shorted turn element (reference numeral 32 in FIG. 1) is shown to be an alternate embodiment in the form of a plurality of electrically conductive but nonmagnetic windings 50 which are circumferentially wound about the rotor magnet 40 within the ring shaped zone 48. The conductive windings 50 are connected at opposing ends so as to form one or more electrically closed loops about the rotor magnet 40. This is a substantial electrical equivalent to the conducting ring 32 illustrated in FIG. 1.

Referring now to FIG. 3, the motor 10 of the present invention is shown in a partially schematic top view illustrating the relative positions of the rotor assembly 18 and the stator assembly 24. In this illustration it is clear that the stator assembly 24 radially surrounds the rotor assembly 18 and that a radial air gap 52 is formed therebetween. In operation the stator assembly 24 remains in a fixed position while the rotor assembly 18 rotates about the central axis of the shaft 16.

The construction of the stator assembly 24 is best understood by consideration of both FIG. 1 and FIG. 3. In FIG. 1 it may be seen that the stator assembly 24 includes a stator stack 60. The stator stack 60 provides the bulk of the mass of the stator assembly 24 and is ordinarily constructed of a series of congruently shaped plates of conducting material axially mounted together to form the stack 60. As is best seen in FIG. 3 the stator stack 60 includes eight stator pole pieces 62 which extend radially inward toward the rotor assembly 18. The stator pole pieces 62 are substantially identical to one another and are each provided with stator pole windings 26 which are wrapped about the pole piece 62 and are utilized to generate induced magnetism within the pole piece 62. The extent and positioning of the stator pole winding 26 is restricted to some degree by plastic or similar winding restrictors 66, illustrated in FIG. 1. The winding restrictors 66 prevent the stator windings 26 from working loose and interfering with the rotation of the rotor assembly 18.

Each stator pole piece 62 culminates on its interior end in a plurality of stator pole teeth 68. The stator pole teeth 68 are substantially similar to the rotor pole teeth 46 and serve the same purpose, that of concentrating the magnetic flux into a limited zone with concurrent increase in flux density, in accordance with electromagnetic principles. When a current is delivered through the stator windings 26 an induced magnetism is set up within the stator pole pieces 62. This induced magnetism is concentrated by the stator pole teeth 68 in such a manner that it causes discrete rotation of the rotor assembly 18 to a stable orientation wherein the rotor pole teeth 46 are positioned in a magnetically stable position with respect to the opposing stator pole piece 62. The considerations for the spacing of the stator pole pieces 62 and the construction and number of stator pole teeth 68 and rotor pole teeth 46 are described in the Warner reference, cited above. In the embodiment shown in FIG. 3, the rotor assembly 18 is provided with fifty rotor pole teeth 46 on each of the rotor yokes 42 and 44 while the stator assembly 24 includes a total of forty pole teeth 68, divided with five stator pole teeth 68 being situated on each of eight stator pole pieces 62. The construction shown results in a step motor having two hundred available discrete steps.

In the illustration of FIG. 3 the stator assembly 24 is shown as being wound in a bifilar manner such as would be utilized with a four phase step motor drive. This variety of winding utilizes a first stator strand 70 (also designated as strand "A" and "A'"), a second stator strand 72 ("B" and "B'") wound in opposite directions. The strands 70 and 72 are alternately activated in accordance with conventional step motor techniques to alternately create opposing magnetic fields in the stator pole pieces 62 and consequently in the stator pole teeth 68. Another set of strands is also provided including a third strand 74 ("C" and "C'") wound identically to the first strand 70 and a fourth strand 76 ("D" and "D'"), wound identically to the second strand 72. The additional strands are utilized to simplify the external circuitry by having each strand carry current only in a single direction. Activation of current in the first strand 70 will cause rotation in one direction while current in third strand 74 will urge rotation in the opposite direction. The paired strands 70 and 74 are not concurrently activated. The same relationship applied to the paired second strand 72 and fourth strand 76.

Conventional operation of a motor utilizing the bifilar winding technique is described in Warner. An applicable circuitry diagram for operating a unipolar, bifilar step motor, such as that shown in FIG. 3, is shown as FIG. IV - 16 of Warner while appropriate associated logic appears in FIG. IV - 7. Other circuit and logic arrangements are permissible and these are only one example. The particular circuit selected should have no effect on the improved performance of the present invention. Manipulation of the current magnitude in strands 70, 72, 74 and 76 causes rotation of the motor shaft 16 and also is the mechanism by which the adaptive back phase damping is accomplished.

The invention would also function properly if the unipolar, bifilar structure of FIG. 3 were replaced by a bipolar winding arrangement. In such a case the third winding 74 and the fourth winding 76 would be absent and the remaining windings would carry current in both directions. For such a motor, the external control circuitry would resemble that illustrated in FIG. IV - 40 of Warner.

Figure 4:
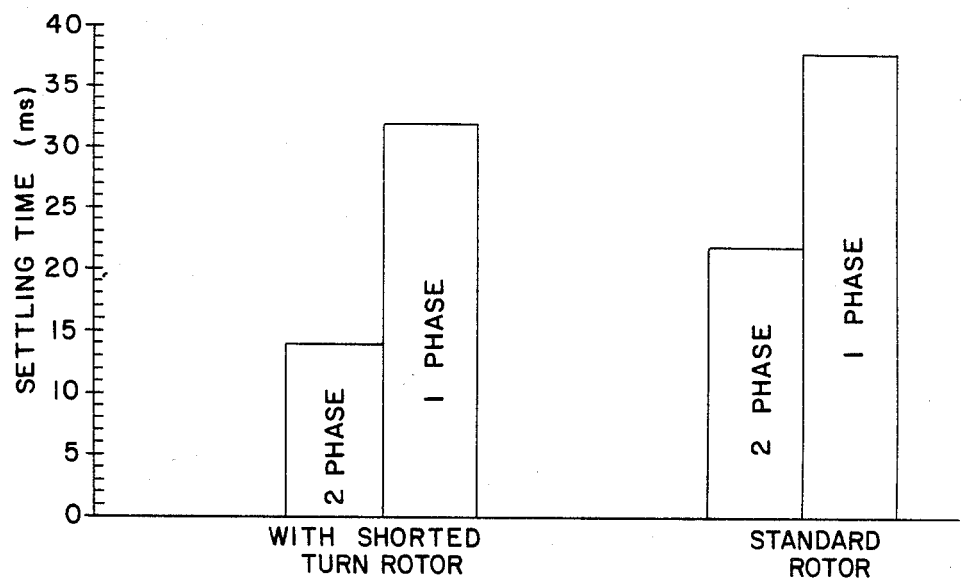
FIG. 4 is a graphical illustration of the effect of the present invention on the settling or oscillation time of the motor.

FIG. 4 graphically represents the results obtained in an experiment wherein identical motors were tested for settling time (oscillation period) when they were constructed both with and without the shorted turn element placed on the rotor. Separate measurements were made depending upon whether a single phase motor or a double phase motor was utilized. Identical oscillation circuitry and otherwise identical motors were utilized in the experiments. As can be seen from the diagrams of FIG. 4, with a single phase motor the settling time was reduced by approximately 20% while with a dual phase motor the settling time was reduced by approximately one third. This represents a substantial improvement and is of extreme value in reducing the time necessary to move from one stopping point to another. The incorporation of such an improvement could, for example, result in the same daisy wheel printer being able to operate at a significantly increased speed (characters per second). In normal operation, the settling time is a very significant fraction (approximately eighty to ninety percent) of the total time necessary to move a step motor from one rest point to a completely stationary status at another rest point. The greater the reduction achieved with the settling time, the greater the concurrent reduction of amount of time which may be allotted for transposition from one location to another.

Figure 5:
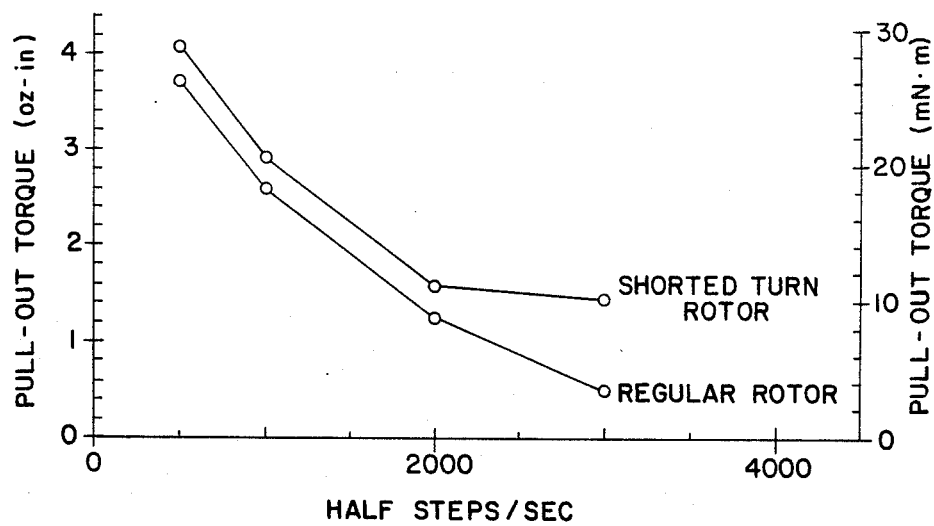
FIG. 5 is a graphical illustration of the relationship between motor steps and pull out torque of both a conventional motor and a motor including the improvement of the present invention.

FIG. 5 illustrates the effect of the installation of the shorted turn element, be it a number of enclosed windings 50 or be it a conductive ring 32, on an otherwise identical motor. FIG. 5 graphically illustrates the relationship between the number of half steps of the motor per second versus the pull-out torque, measured in ounce inches on the left hand scale and in micro Newton meters on the right hand scale.

The term pull-out torque is utilized exclusively with step motors and has been defined as the maximum torque that can be applied to the shaft of a step motor which is running at a constant frequency that will not cause the motor to lose synchronism (Warner, page IX-4). This characteristic is extremely relevant to the operation of a motor since it defines the amount of drag or friction that can be placed on the shaft without adversely affecting the performance of the motor. The greater the amount of pull-out torque at a given rotational speed the better the operation of the motor at that speed and the more powerful the result.

As can be clearly seen from the illustration of FIG. 5, the addition of the shorted turn to the rotor assembly results in a significant improvement in the pull-out torque, especially at higher rotational speeds. The curves remain essentially parallel throughout the lower speed ranges but, when the speed of rotation is increased above 2,000 half-steps per second, the curves diverge substantially with a shorted turn motor 10 clearly outperforming the regular motor. It is also noted that the pull-out torque is higher at all points along the curve for the shorted turn motor 10.

Although it is not clearly understood how or why the shorted turn device results in the improved performance characteristics the results have been consistent in all experiments attempted.

Furthermore, in addition to the other advantageous results set forth above it has also been found that the presence of a shorted turn helps to prevent demagnetization of the rotor magnet. In general, it is suspected that the conducting loop interferes with the electromagnetic induction of magnetic fields in the magnet based upon outside forces. In this manner the shorted turn operates in much the same way as a conducting enclosure, it being a well known principle that no external fields can exist within an enclosed conducting box. One by-product of this is that the shorted turn 32 must be installed subsequent to the magnetization of the rotor magnet 40, in order to obtain normal results. Otherwise, there is interference with the magnetization and a reduced magnetic field is achieved in the magnet 40. Another factor that must be taken into account is that the shorted turn must not be constructed of a magnetic material, or it will be magnetized during operation and will lose effectiveness.

The same principle probably is responsible for the other salutary properties of a shorted turn motor. The hindrance of external inductive fields or flux patterns acts to balance and "smooth-out" the desirable flux created by the rotor magnet. Thus, a greater consistency is obtained and better results are found. This results in improved mid-range and high speed resonances.

The precise nature of the shorted turn element used does not appear to be critical to operation. Tests have shown that a solid conducting ring and a single conducting strand wound several times around will result in very similar responses. The requirement is that a complete electrical circuit about the rotor magnet is provided and that the electrical conductor be nonmagnetic. It appears that the greater the degree of enclosure the more significant the effect, but the magnitude of this effect has not been established. Empirical evidence indicates that a minimum of three turns of a narrow gauge (36 A.W.G. size) conducting strand are desirable.

It does not appear as if isolating the shorted turn element from the rotor yokes 42 and 44 has any great effect. Although this may be accomplished by bonding the conducting ring 32 to the rotor magnet 40 such that it does not contact either of the rotor yokes 42 or 44 or by utilizing insulated conductive strands 50 as the shorted turn elements it is not deemed necessary since the relative conductivities of the shorted turn 32 and the yokes 42 are so disparate that no effective circuit or electrical shorting occurs. Uninsulated conductive strands 50 may also be utilized if they are bonded in such a manner that they do not contact either of the rotor yokes. It might be desirable, in extreme situations, to prevent any direct electrical contact between the opposing yokes 42 and 44. However, this connection may only result in extremely minimal impairment to the performance of the motor 10 since the relative resistances of the elements involved are such that the current transfer through such a connection could probably be irrelevant in that its magnitude would result in a negligible effect.

Obviously, various modifications could be made to the preferred embodiment without adversely affecting the results in any great degree. For example other forms of enclosing conductors might be employed, or insulated wires might be substituted for the bare wires of the preferred conducting strands 50.

Hybrid type synchronous inductor motors are constructed in a variety of ways, although only the disk-type magnetization has been shown in the drawing. Another embodiment of the hybrid rotor which is commonly utilized incorporates a barrel-shaped hollow magnet which is held in position surrounding the rotor by the bonding to the yokes. A rotor of this type is illustrated in FIG. II-22 of Warner. Since rotors of this type also include an exposed ring-shaped zone of the rotor magnet it is entirely feasible to adapt the shorted turn mechanism of the present invention to motors of this type.

It is also common for step motors to include more than one rotor magnet element. When multiple rotor magnets are utilized they are axially displaced along the shaft in such a manner that each magnet and its associated yokes will interact simultaneously with the stator poles. In this manner, improved power characteristics may be obtained. For adaptation of the present invention to rotors utilizing multiple motor magnets it is only necessary to apply the shorted turn device to each of the ring-shaped zones appearing on opposing rotor yokes along the shaft. Thus, for a two rotor magnet motor there would be two conducting rings 32 or two sets of conducting strands 50 installed on the rotor assembly 18. Results very similar in nature to those described above for a single rotor magnet motor would be obtained.

The principle of the shorted turn rotor may also be incorporated into other types of motors besides the hybrid synchronous inductor type. However, ordinarily these motors are not constructed in such a manner as to have an area corresponding to the ring-shaped zone 48 of the synchronous inductor motors for which the invention has been developed. Therefore, a modified construction would have to be employed before the full benefits of the invention could be obtained in these other types of motors.

Those skilled in the art will readily observe that numerous modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The present invention is adapted to be utilized with hybrid synchronous inductor step motors of conventional design. These motors are utilized in various applications, particularly in the data processing industry. The improvement of the present invention results in a substantial reduction of the oscillation or settling time in these types of motors when adaptive back phase damping is applied or in situations where no special damping mechanism is utilized. This results in a reduced amount of time for movement of the device controlled by the step motor from one desired position to the next desired position. This time reduction consequently increases the maximum operable speed of the device. The improvement of the present invention is utilized in constructing the motor by applying the shorted turn element to an otherwise conventionally constructed rotor assembly. It is even possible to obtain the benefits of the present invention by disassembling a conventional motor and inserting the shorted turn device on the rotor assembly. For this reason, it is expected that the benefits of the present invention will be readily available in an extremely wide variety of motors and applications.

Since the improved self-damping motor of the present invention will have substantial beneficial results in numerous step motor utilizations, has no known detrimental side effects on the operation, and since it adds only very slightly to the cost and complexity of the motor, it is expected that it will have extremely widespread industrial utility and commercial viability.

I claim:

1. An electromagnetic step motor having improved damping capabilities, comprising:
    a stator portion including a plurality of congruent radially separated stator poles, the extremities of each of said stator poles being divided into a plurality of stator pole teeth, each said stator pole being wound with one or more conductive strands, such that when electrical current is generated in said strands a magnetic field is induced in said stator pole;
    a rotor portion, radially displaced from but axially opposing said stator portion and rotating freely with respect thereto, including a shaft and at least one radially symmetrical permanent magnet portion radially surrounding said shaft and rotating therewith, which magnet portion is axially bordered by a pair of symmetrical opposing yokes such that an axial gap is formed between said pair of yokes to define a ring shaped zone of exposed magnet of said magnet portion opposing the stator portion, and further including electrically conductive means situated within said gap and circumferentially surrounding said ring-shaped zone; and
    current providing means for generating electrical current within said conductive strands of the stator portion.

2. The motor of claim 1 wherein:
    said magnet is a radially polarized permanently magnetized disk.

3. The motor of claim 1 wherein:
    said magnet is a radially polarized permanently magnetized ring.

4. The motor of claim 1 wherein:
    said conductive means is a continuous band of electrically conductive material.

5. the motor of claim 1 wherein:
    said conductive means is one or more strands of conductive material wound circumferentially about said ring shaped zone.

6. The motor of claim 1 wherein:
    said conductive means is constructed of nonmagnetic material.

7. The motor of claim 1 wherein:
    said conductive means is electrically insulated from said yokes.

8. The motor of claim 1 and further including:
    a second ring shaped zone provided with a second conducting means.

9. The motor of claim 5 wherein:
    the total number of complete loops of said strands about said ring-shaped zone is greater than or equal to three.

10. In an electromagnetic step motor including a stator having a plurality of stator pole teeth and radially surrounding a rotor including at least one radially symmetrical permanent magnet axially surrounded by an opposing pair of field enhancing pole pieces, the pole pieces having a plurality of rotor pole teeth arrayed opposite the stator pole teeth, wherein a ring shaped zone of the permanent magnet is exposed axially intermediate each pair of stator pole pieces and radially opposite the stator, the improvement comprising:
  providing closed loop conductive means about the ring shaped zone.

11. The improvement of claim 10 wherein:
said closed loop conductive means is formed of a continuous band of conductive material.

12. the improvement of claim 10 wherein:
said closed loop conductive means is formed of a plurality of windings formed of conductive material.

13. The improvement of claim 10 wherein:
said closed loop conductive means is electrically insulated from the pole pieces.

14. The improvement of claim 10 wherein:
said closed loop conductive means is constructed of a nonmagnetic material.

15. The improvement of claim 11 wherein:
said band has a width of at least one half the width of the ring shaped zone.

16. The improvement of claim 12 wherein:
the number of said windings is greater than or equal to three.

* * * * *